US010681697B2

(12) United States Patent
Yamada et al.

(10) Patent No.: US 10,681,697 B2
(45) Date of Patent: Jun. 9, 2020

(54) BASE STATION APPARATUS, TERMINAL APPARATUS, AND COMMUNICATION METHOD

(71) Applicants: SHARP KABUSHIKI KAISHA, Sakai, Osaka (JP); FG INNOVATION COMPANY LIMITED, Tuen Mun, New Territories (HK)

(72) Inventors: Ryota Yamada, Sakai (JP); Hiromichi Tomeba, Sakai (JP)

(73) Assignees: SHARP KABUSHIKI KAISHA, Sakai, Osaka (JP); FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 16/313,101

(22) PCT Filed: Jun. 27, 2017

(86) PCT No.: PCT/JP2017/023492
§ 371 (c)(1),
(2) Date: Dec. 24, 2018

(87) PCT Pub. No.: WO2018/008459
PCT Pub. Date: Jan. 11, 2018

(65) Prior Publication Data
US 2019/0223177 A1 Jul. 18, 2019

(30) Foreign Application Priority Data

Jul. 5, 2016 (JP) .................. 2016-133244
Jul. 5, 2016 (JP) .................. 2016-133245
Jul. 5, 2016 (JP) .................. 2016-133246

(51) Int. Cl.
*H04W 72/04* (2009.01)
*H04W 28/06* (2009.01)
(Continued)

(52) U.S. Cl.
CPC ......... *H04W 72/0446* (2013.01); *H04L 5/005* (2013.01); *H04L 5/0032* (2013.01);
(Continued)

(58) Field of Classification Search
CPC . H04W 72/0446; H04W 72/04; H04W 28/06; H04W 56/001; H04L 5/005;
(Continued)

(56) References Cited

U.S. PATENT DOCUMENTS

2015/0256308 A1 9/2015 Ma et al.
2016/0352551 A1* 12/2016 Zhang ................. H04L 27/2646
(Continued)

FOREIGN PATENT DOCUMENTS

WO 2018/024065 A1 2/2018

OTHER PUBLICATIONS

Qualcomm Incorporated, "Numerology and TTI multiplexing for NR Forward Compatibility Analysis", R1-164692, 3GPP TSG-RAN WG1#85 May 23-27, 2016.
LG Electronics, "Initial Evaluation Result for NR Numerology", R1-165431, 3GPP TSG RAN WG1 Meeting #85, Nanjing, China May 23-27, 2016.
U.S. Appl. No. 62/356,521.
IMT Vision—Framework and overall objectives of the future development of IMT for2020 and beyond, Recommendation ITU-R M.2083-0, Sep. 2015.
(Continued)

*Primary Examiner* — Walli Z Butt
(74) *Attorney, Agent, or Firm* — ScienBiziP, P.C.

(57) ABSTRACT

Provided are a base station apparatus, a terminal apparatus, and a communication method that enable the improvement of communication performance in a system in which multiple frame formats are used. A transmitter configured to transmit one or more subframes defined with a given fixed time length is provided, wherein at least one subframe out of the subframes includes a common signal interval which is an interval for transmitting a common signal in a cell, the common signal interval includes a signal generated by a first parameter set, and an interval other than the common signal interval includes a signal generated by the first parameter set or a signal generated by a second parameter set different
(Continued)

from the first parameter set at least in terms of a subcarrier spacing.

2 Claims, 8 Drawing Sheets

(51) Int. Cl.
*H04L 5/00* (2006.01)
*H04W 56/00* (2009.01)
(52) U.S. Cl.
CPC ......... *H04W 28/06* (2013.01); *H04W 56/001* (2013.01); *H04W 72/04* (2013.01)
(58) Field of Classification Search
CPC ..... H04L 5/0032; H04L 5/0044; H04L 5/001; H04L 5/0073; H04L 27/2607
See application file for complete search history.

(56) References Cited

U.S. PATENT DOCUMENTS

| | | | |
|---|---|---|---|
| 2017/0164350 A1* | 6/2017 | Sun | H04L 5/00 |
| 2018/0270093 A1* | 9/2018 | Lopez | H04J 11/00 |
| 2018/0278388 A1* | 9/2018 | Liu | H04L 27/26 |
| 2019/0075006 A1* | 3/2019 | Yi | H04L 5/0007 |
| 2019/0379570 A1* | 12/2019 | Yamada | H04W 74/006 |

OTHER PUBLICATIONS

Guangdong Oppo Mobile Telecom, Frame structure supporting flexible parameter allocations, R1-164472, 3GPP TSG-RAN WG1 #85, Nanjing, China, May 23-27, 2016.

\* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which areas covered by base station apparatuses (base stations, transmission stations, transmission points, downlink transmission devices, uplink reception devices, a group of transmit antennas, a group of transmit antenna ports, component carriers, eNodeB, access points, AP) or transmission stations equivalent to the base station apparatuses are arranged in the form of multiple cells (Cells) being linked together. The base station apparatus is connected to a terminal apparatus (reception stations, reception points, downlink reception devices, uplink transmission devices, a group of receive antennas, a group of receive antenna ports, UE, a station, STA). In such a cellular configuration, frequency efficiency can be improved by using the same frequency among neighboring cells or sectors.

Research and development activities related to the 5th generation mobile radio communication system (5G system) are being actively carried out, aiming to start commercial services around the year 2020. A vision recommendation on the standard system of the 5G system (International mobile telecommunication-2020 and beyond: IMT-2020) was recently reported (see NPL 1) by the International Telecommunication Union Radio Communication Sector (ITU-R), which is an international standardization organization.

The 5G system envisages a radio access network operated by combining various frequency bands to satisfy various requirements represented by three large use scenarios (Enhanced mobile broadband (EMBB), Enhanced Massive machine type communication (eMTC), and Ultra-reliable and low latency communication (URLLC)). Therefore, in the 5G system, unlike in the conventional LTE/LTE-A, while based on the same access method, multiplexing frame formats that include different radio parameters (such as subcarrier intervals) to use is considered.

CITATION LIST

Non Patent Literature

NPL 1: "IMT Vision—Framework and overall objectives of the future development of IMT for 2020 and beyond", Recommendation ITU-R M. 2083-0, September 2015.

SUMMARY OF INVENTION

Technical Problem

However, it is assumed that a different communication system and a different communication method suited to each of multiple frame formats will exist. The 5G system needs to be a system that maintains communication suited to each of the frame formats and integrates such communication systems and/or methods.

The present invention has been made in view of such circumstances, and its object is to provide a base station apparatus, a terminal apparatus, and a communication method that enable the improvement of communication performance such as throughput and communication efficiency in a system in which multiple frame formats are used.

Solution to Problem

To address the above-mentioned drawbacks, a base station apparatus, a terminal apparatus, and a communication method according to an aspect of the present invention are configured as follows.

The base station apparatus according to an aspect of the invention is a base station apparatus for communicating with a terminal apparatus, the base station apparatus including a transmitter configured to transmit one or more subframes defined with a given fixed time length, wherein at least one subframe out of the subframes includes a common signal interval which is an interval for transmitting a common signal in a cell, the common signal interval includes a signal generated by a first parameter set, and an interval other than the common signal interval includes a signal generated by the first parameter set or a signal generated by a second parameter set different from the first parameter set at least in terms of a subcarrier spacing.

In the base station apparatus according to an aspect of the invention, a synchronization signal is transmitted in the common signal interval.

In the base station apparatus according to an aspect of the invention, a subframe including the common signal interval is transmitted at a same cycle as the synchronization signal.

In the base station apparatus according to an aspect of the invention, the synchronization signal includes a primary synchronization signal and a secondary synchronization signal, the primary synchronization signal is transmitted in the common signal interval, and the secondary synchronization signal is transmitted in an interval other than the common signal interval.

In the base station apparatus according to an aspect of the invention, the communication with the terminal apparatus is performed in a primary cell and a secondary cell, a subframe not including the common signal interval is transmitted in the primary cell, and a subframe including the common signal interval is transmitted in the secondary cell.

The terminal apparatus according to an aspect of the invention is a terminal apparatus for communicating with a base station apparatus, the terminal apparatus including a receiver configured to receive one or more subframes defined with a given fixed time length, wherein at least one subframe out of the subframes includes a common signal interval which is an interval for transmitting a common signal in a cell, the common signal interval includes a signal generated by a first parameter set, and an interval other than the common signal interval includes a signal generated by the first parameter set or a signal generated by a second parameter set different from the first parameter set at least in terms of a subcarrier spacing.

In the terminal apparatus according to an aspect of the invention, a synchronization signal is received in the common signal interval, and a cell search is performed using the synchronization signal.

In the base station apparatus according to an aspect of the invention, a subframe including the common signal interval is received at a same cycle as the synchronization signal.

In the base station apparatus according to an aspect of the invention, the synchronization signal includes a primary synchronization signal and a secondary synchronization signal, the primary synchronization signal is received in the common signal interval, and the secondary synchronization signal is received in an interval other than the common signal interval.

In the terminal apparatus according to an aspect of the invention, the communication with the base station apparatus is performed in a primary cell and a secondary cell, a subframe not including the common signal interval is transmitted in the primary cell, and a subframe including the common signal interval is transmitted in the secondary cell.

The communication method according to an aspect of the invention is a communication method for a base station apparatus for communicating with a terminal apparatus, the communication method including the steps of transmitting one or more subframes defined with a given fixed time length, wherein at least one subframe out of the subframes includes a common signal interval which is an interval for transmitting a common signal in a cell, the common signal interval includes a signal generated by a first parameter set, and an interval other than the common signal interval includes a signal generated by the first parameter set or a signal generated by a second parameter set different from the first parameter set at least in terms of a subcarrier spacing.

The communication method according to an aspect of the invention is a communication method for a terminal apparatus for communicating with a base station apparatus, the communication method including the steps of receiving one or more subframes defined with a given fixed time length, wherein at least one subframe out of the subframes includes a common signal interval which is an interval for transmitting a common signal in a cell, the common signal interval includes a signal generated by a first parameter set, and an interval other than the common signal interval includes a signal generated by the first parameter set or a signal generated by a second parameter set different from the first parameter set at least in terms of a subcarrier spacing.

Advantageous Effects of Invention

The present invention enables the improvement of communication performance in a system in which multiple frame formats are used.

DESCRIPTION OF EMBODIMENTS

A communication system according to the present embodiment includes a base station apparatus (a transmission device, cells, a transmission point, a group of transmit antennas, a group of transmit antenna ports, component carriers, eNodeB) and terminal apparatuses (a terminal, a mobile terminal, a reception point, a reception terminal, a reception device, a group of receive antennas, a group of receive antenna ports, UE). A base station apparatus connected to a terminal apparatus (establishing a wireless link) is referred to as a serving cell.

The base station apparatus and the terminal apparatus according to the present embodiment can communicate in a frequency band for which a license is needed (licensed band) and/or in a frequency band for which no license is needed (unlicensed band).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
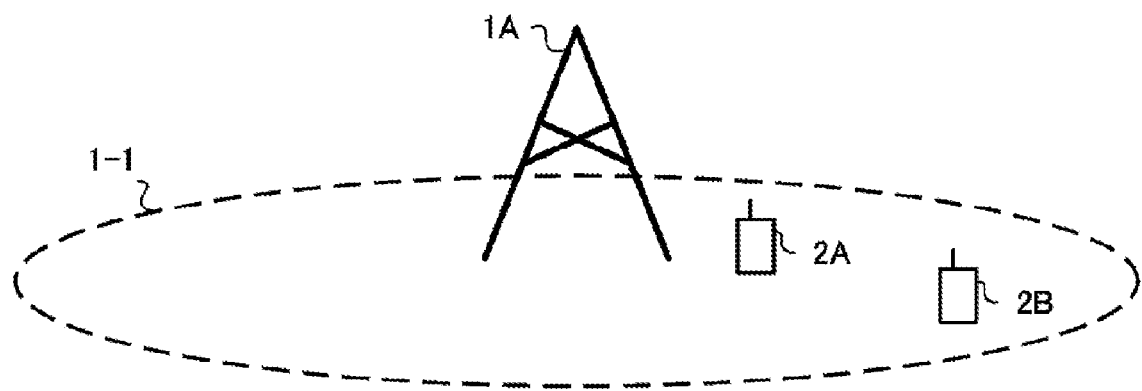
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A can connect to the terminal apparatuses. The terminal apparatuses 2A and 2B are also collectively referred to as terminal apparatuses 2.

With respect to FIG. 1, the following uplink physical channels are used for uplink radio communication from the terminal apparatus 2A to the base station apparatus 1A. The uplink physical channels are used for transmitting information output from higher layers.

Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive acknowledgement (ACK) or a negative acknowledgement (NACK) (ACK/NACK) for downlink data (a downlink transport block or a Downlink-Shared Channel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, a Reference Signal (CSI-RS) specifying a suited CSI-RS resource, CSI-RS Resource Indication (CRI), and the like.

The Channel Quality Indicator (CQI) (hereinafter, referred to as a CQI value) can be a suited modulation scheme (e.g., QPSK, 16QAM, 64QAM, 256QAM, or the like) and a coding rate in a prescribed band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator (CQI) are collectively referred to as CSI values.

The PUSCH is used for transmission of uplink data (an uplink transport block, UL-SCH). Furthermore, the PUSCH may be used for transmission of ACK/NACK and/or Channel State Information along with the uplink data. In addition, the PUSCH may be used to transmit the Uplink Control Information only.

The PUSCH is used to transmit an RRC message. The RRC message is a signal/information that is processed in a Radio Resource Control (RRC) layer. Further, the PUSCH is used to transmit an MAC Control Element (CE). Here, MAC CE is a signal/information that is processed (transmitted) in a Medium Access Control (MAC) layer.

For example, a power headroom may be included in MAC CE and may be reported via the PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from the higher layers, but is used by the physical layer. The Uplink Reference Signal includes a Demodulation Reference Signal (DMRS) and a Sounding Reference Signal (SRS).

The DMRS is associated with transmission of the PUSCH or the PUCCH. For example, the base station apparatus 1A uses DMRS in order to perform channel compensation of the PUSCH or the PUCCH. The SRS is not associated with the transmission of the PUSCH or the PUCCH. For example, the base station apparatus 1A uses SRS to measure an uplink channel state.

In FIG. 1, the following downlink physical channels are used for the downlink radio communication from the base station apparatus 1A to the terminal apparatus 2A. The downlink physical channels are used for transmitting information output from the higher layers.

Physical Broadcast Channel (PBCH)
Physical Control Format Indicator Channel (PCFICH)
Physical Hybrid automatic repeat request Indicator Channel (PHICH, HARQ indicator channel)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, a Broadcast Channel (BCH)) that is shared by the terminal apparatuses. The PCFICH is used for transmission of information indicating a region (e.g., the number of Orthogonal Frequency Division Multiplexing (OFDM) symbols) to be used for transmission of the PDCCH.

The PHICH is used for transmission of ACK/NACK with respect to uplink data (a transport block, a codeword) received by the base station apparatus 1A. In other words, the PHICH is used for transmission of a HARQ indicator (HARQ feedback) indicating ACK/NACK with respect to the uplink data. Note that ACK/NACK is also called HARQ-ACK. The terminal apparatus 2A reports ACK/NACK having been received to a higher layer. ACK/NACK refers to ACK indicating a successful reception, NACK indicating an unsuccessful reception, and DTX indicating that no corresponding data is present. In a case that the PHICH for uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of the PDSCH resource allocation, information of a Modulation and Coding Scheme (MCS) for the PDSCH, a TPC command for the PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of the PUSCH resource allocation, information of MCS for the PUSCH, a TPC command for the PUSCH, and the like. Here, the DCI format for the uplink is also referred to as uplink grant (or uplink assignment).

The DCI format for the uplink may be used to request Channel State Information (CSI, which is also called reception quality information) (CSI request) for the downlink.

The DCI format for the uplink can be used for a configuration indicating an uplink resource to which a channel state information report (a CSI feedback report) is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (Aperiodic CSI). The CSI feedback report can be used for a mode configuration (CSI report mode) to aperiodically report the Channel State Information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PUSCH resource is scheduled in accordance with the uplink grant, the terminal apparatus transmits uplink data and/or uplink control information of the scheduled PUSCH.

The PDSCH is used for transmission of downlink data (a downlink transport block, DL-SCH). The PDSCH is used to transmit a system information block type 1 message. The system information block type 1 message is cell-specific information.

The PDSCH is used to transmit a system information message. The system information message includes system information block X other than system information block type 1. The system information message is cell-specific information.

The PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. The PDSCH is used for transmission of MAC CE.

Here, the RRC message and/or MAC CE is also referred to as higher layer signaling.

The PDSCH can be used to request downlink channel state information. The PDSCH can be used for transmission of an uplink resource to which a channel state information report (a CSI feedback report) is mapped, the CSI feedback report being fed back to the base station apparatus by the terminal apparatus. For example, the CSI feedback report can be used for a configuration indicating an uplink resource for periodically reporting Channel State Information (Periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS) or a terminal-specific reference signal or a terminal apparatus-specific reference signal relating to PDSCH, a Demodulation Reference Signal (DMRS) relating to EPDCCH, a Non-Zero Power Chanel State Information-Reference Signal (NZP CSI-RS), and a Zero Power Chanel State Information-Reference Signal (ZP CSI-RS).

The CRS is transmitted in all bands of a subframe and is used to perform demodulation of PBCH/PDCCH/PHICH/PCFICH/PDSCH. The URS relating to PDSCH is transmitted in a subframe and a band that are used for transmission of PDSCH to which URS relates, and is used to demodulate PDSCH to which URS relates.

The DMRS relating to EPDCCH is transmitted in a subframe and a band that are used for transmission of EPDCCH to which DMRS relates. The DMRS is used to demodulate EPDCCH to which DMRS relates.

A resource for NZP CSI-RS is configured by the base station apparatus 1A. For example, the terminal apparatus 2A performs signal measurement (channel measurement), using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. The MBSFN RS is used to demodulate PMCH. The PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are collectively referred to as a physical channel. The downlink physical signal and the uplink physical signal are also collectively referred to as a physical signal.

The BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

With respect to a terminal apparatus supporting Carrier Aggregation (CA), the base station apparatus is able to communicate by integrating multiple Component Carriers (CC) for transmission of wider bandwidth. In carrier aggregation, one Primary Cell (PCell) and one or more Secondary Cells (SCell) are configured as a set of serving cells.

In Dual Connectivity (DC), a Master Cell Group (MCG) and a Secondary Cell Group (SCG) are configured as a group of serving cells. The MCG is constituted of a PCell and optionally one or more SCells. The SCG is constituted of a primary SCell (PSCell) and optionally one or more SCells.

The base station apparatus can perform communication by using a radio frame. The radio frame is constituted of multiple subframes (sub interval). In a case that a frame length is expressed in time, for example, a radio frame length may be 10 ms and a subframe length may be 1 ms. One radio frame is constituted by 10 subframes in this example. A subframe includes multiple OFDM symbols, and thus a subframe length may be expressed by the number of OFDM symbols. For example, the subframe length may be 14 OFDM symbols. The following description is given under the assumption that the subframe length is 1 ms in case it is expressed in time, but the present invention is not limited to this. Further, the subframe may include an uplink interval for communicating the uplink signal/channel, and/or a downlink interval for communicating the downlink signal/channel. Namely, the subframe may be constituted only by uplink intervals, may be constituted only by downlink intervals, or may be constituted by the uplink intervals and the downlink intervals. Further, the subframe may include a guard interval (a null interval). It should be noted that the position where the guard interval can be placed and/or the guard interval length may be fixed, or may be configured by the base station apparatus. The configurable interval length may be different between a case in which the guard interval is disposed to the front of the subframe and the case in which it is disposed to the back. In the subframe that includes the uplink interval, the downlink interval and the guard interval, the interval length may be fixed depending on the arrangement of each interval. The base station apparatus can configure the arrangement and interval length of the uplink interval/downlink interval/guard interval of the subframe, either by configuring them in the higher layer or by transmitting them to the terminal included in the control information. The base station apparatus can perform the configuration for each subframe or each subframe group.

A subframe includes one or more OFDM symbols. In the following embodiments, the OFDM symbol to be indicated is an OFDM symbol generated based on Inverse Fast Fourier Transform (IFFT), and the OFDM signal to be indicated is an OFDM symbol to which a guard interval is added. Note that the guard interval is a zero interval, Cyclic Prefix (CP), or the like.

Multiple parameters may be configured for generating an OFDM symbol. The parameters include a subcarrier spacing and/or the number of Fast Fourier Transform (FFT) points. A base parameter which is a basic parameter of multiple parameters is configured. Parameters other than the base parameter can be obtained based on the base parameter. For example, in a case that the subcarrier spacing of the base parameter is 15 kHz, the parameters other than the base parameter may be set to N times 15 kHz (N is an integer or a power of 2). A parameter with a fixed value for a subcarrier spacing or the like is also referred to as a parameter set. The following embodiments are described under the assumption that, as an example, the first parameter set is configured with subcarrier spacing of 15 kHz and the second parameter set with subcarrier spacing of 30 kHz, but the present invention is not limited to this. Further, the number of parameter sets that can be configured by the base station apparatus is not limited to two. Further, in the following embodiments, the number of FFT points of the first parameter set and the second parameter set is the same unless otherwise specified. In other words, the OFDM symbol length becomes shorter as the subcarrier spacing becomes wider. The OFDM symbols generated by the first parameter set and the second parameter set are also referred to as a first OFDM symbol and a second OFDM symbol, respectively. Further, multiple types of CP lengths may be configured. Further, multiple types of CP lengths may be configured for each parameter set. Here, a case where two kinds of CP lengths are configured will be described. The two types of CP are also referred to as a first CP and a second CP. In the same parameter set, the second CP length is longer than the first CP length. Further, the first CP length and the second CP length may be set at about the same ratio to the OFDM symbol in each parameter set. Note that the first CP is also referred to as a normal CP and the second CP is also referred to as an extended CP. The OFDM signal in which the first CP or the second CP is added to the first OFDM symbol is also referred to as a first OFDM signal-1 and a first OFDM signal-2, respectively. The OFDM signal in which the first CP or the second CP is added to the second OFDM symbol is also referred to as a second OFDM signal-1 and a second OFDM signal-2, respectively.

The parameter set supported by the terminal apparatus is reported to the base station apparatus as the function (capability) of the terminal apparatus or the category of the terminal apparatus.

Figure 2:
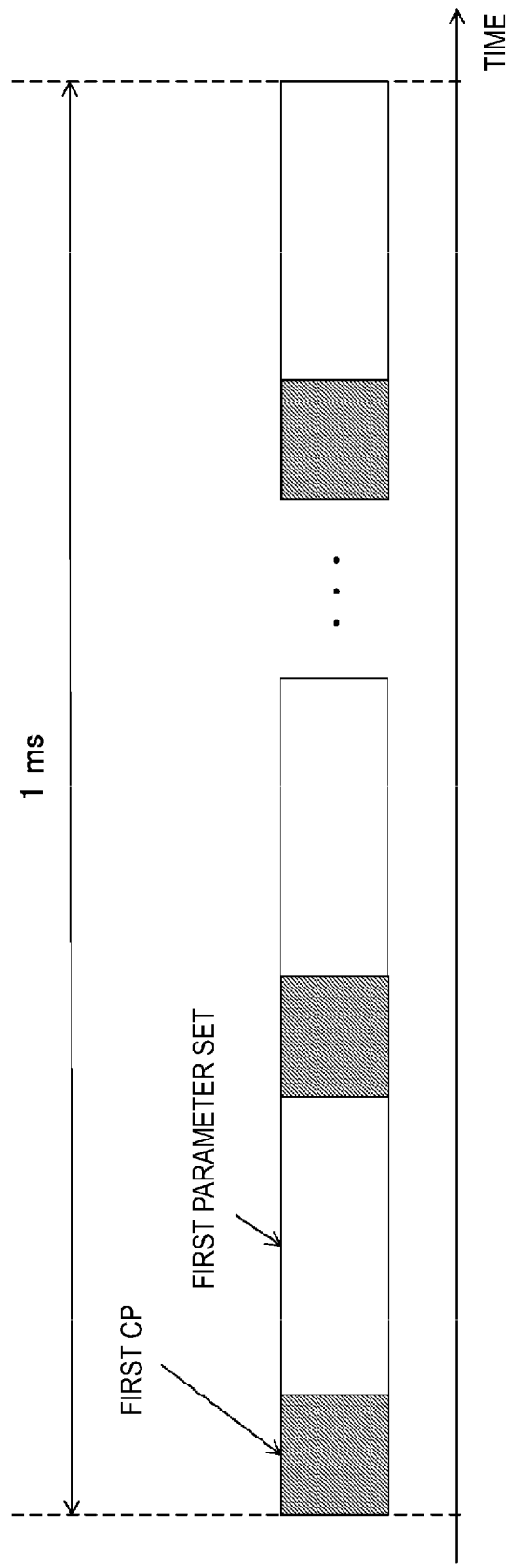
FIG. 2 is a diagram illustrating an example of a frame structure according to the present embodiment.
Figure 3:
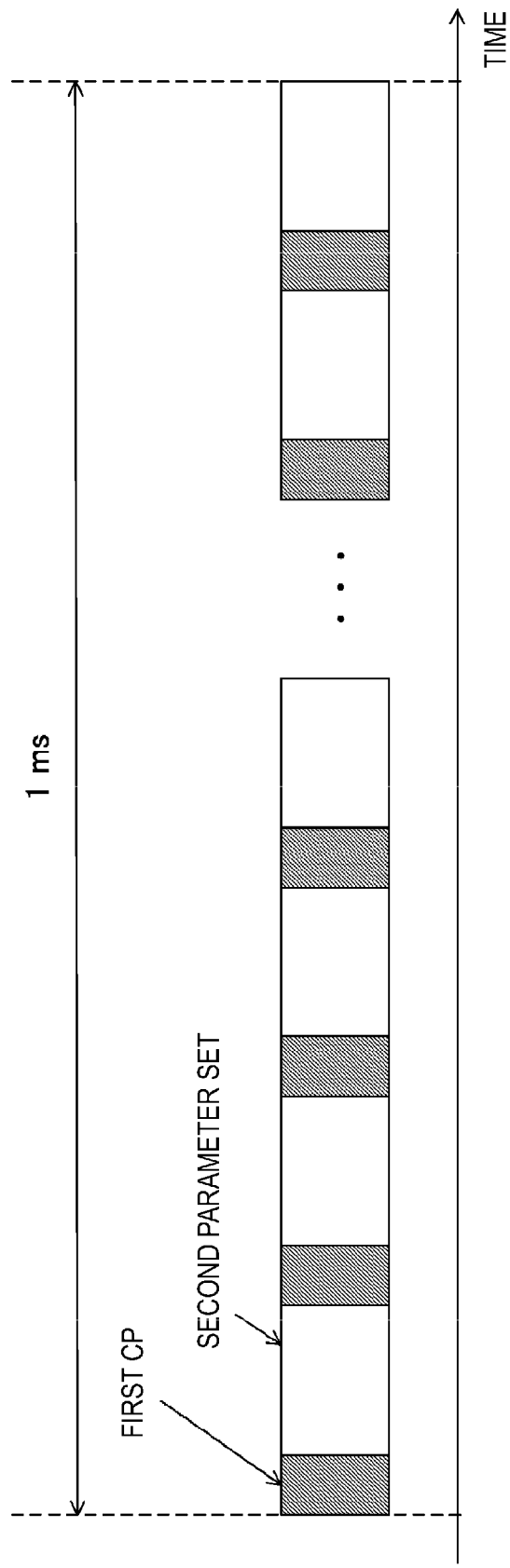
FIG. 3 is a diagram illustrating an example of the frame structure according to the present embodiment.
Figure 4:
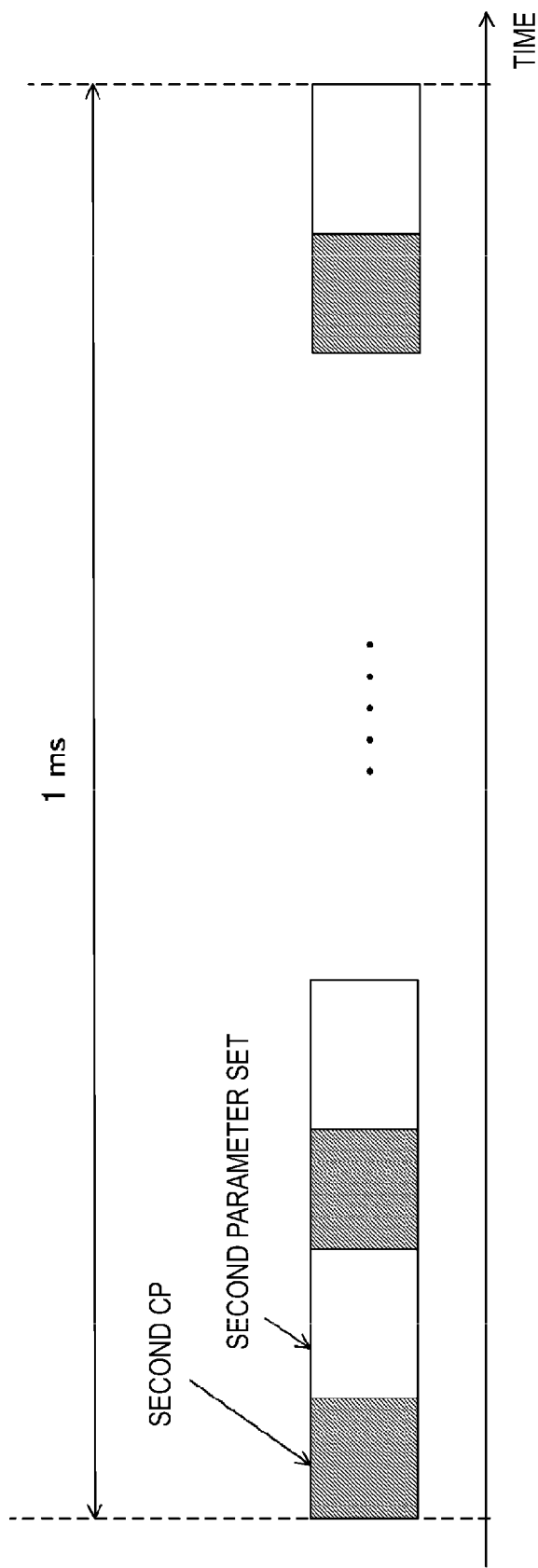
FIG. 4 is a diagram illustrating an example of the frame structure according to the present embodiment.

FIGS. 2 to 6 are examples of subframe structures. FIG. 2 is a diagram illustrating an example of a subframe configured with the first OFDM signal-1. FIG. 3 is a diagram illustrating an example of a subframe configured with the second OFDM signal-1. Since the first parameter set includes a subcarrier spacing of 15 kHz and the second parameter set includes a subcarrier spacing of 30 kHz, the length of the second OFDM signal-1 is half the length of the first OFDM-1. Therefore, in a case that it is assumed that 14 first OFDM signals-1 are included in 1 ms, 28 second OFDM signals-1 are included in 1 ms. FIG. 4 is a diagram illustrating an example of a subframe configured with the second OFDM signal-2. In the same carrier frequency (band), the propagation environment such as multipath delay is considered to be equivalent irrespective of the parameters. Therefore, it is desirable that the required CP length is determined for each carrier frequency (band). In this case, the base station apparatus transmits the OFDM signal with a suitable CP length for each carrier frequency (band). In other words, the terminal apparatus performs reception processing assuming the CP length determined by the carrier frequency (band).

Figure 5:
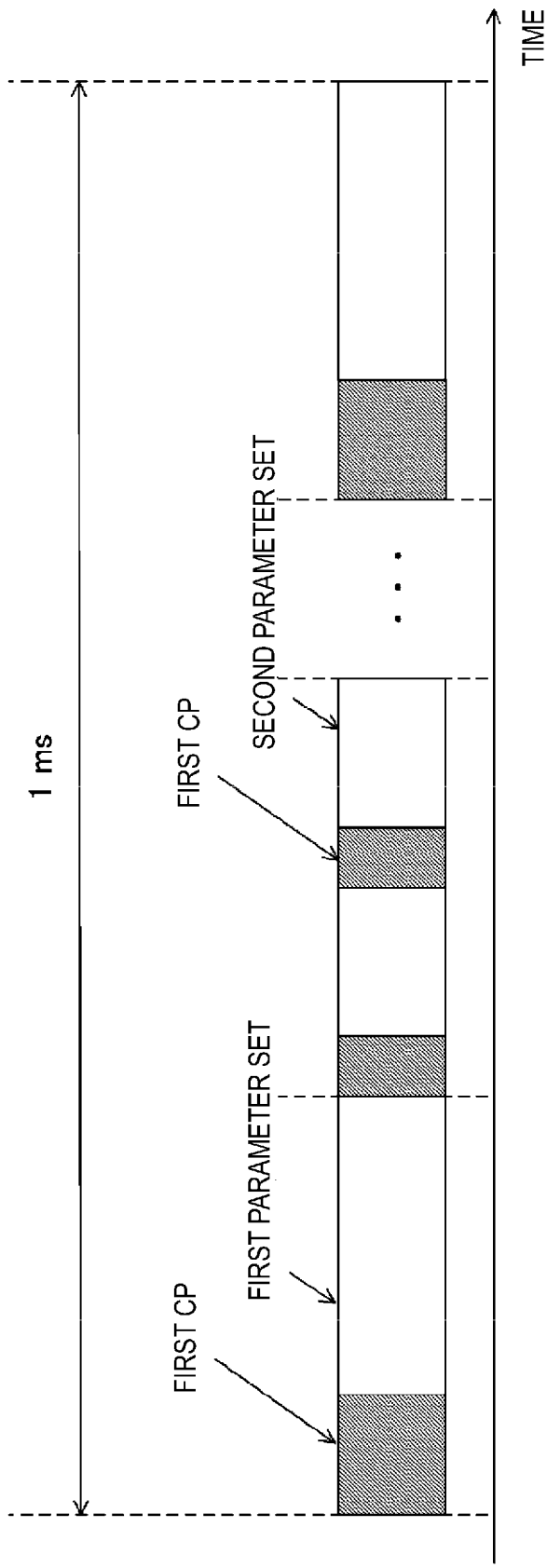
FIG. 5 is a diagram illustrating an example of the frame structure according to the present embodiment.

FIG. 5 illustrates an example in which the first OFDM signal-1 and the second OFDM signal-2 are multiplexed within 1 ms. Since the length of the second OFDM signal-1 is half the length of the first OFDM-1, the interval of the first OFDM signal-1 includes two second OFDM signals-2. Therefore, the base station apparatus can select which of the first OFDM signal-1 or two second OFDM signals-1 to dispose for each interval of the first OFDM signal-1. In the example of FIG. 5, two second OFDM signals-1 are arranged in the interval of the second first OFDM signal-1. Note that there is a possibility that the CP length slightly changes for each OFDM signal. For example, in the Long Term Evolution (LTE), 14 first OFDM signals-1 are included within a subframe at a subcarrier spacing of 15 kHz. Of the 14 first OFDM signals-1, the CP length added to the first OFDM signal and the eighth OFDM signal is different from the CP length added to the remaining OFDM signals. In a case that the subcarrier spacing is 30 kHz with the parameters similar to those with the LTE, out of the 28 second OFDM signals-1, the CP length added to the first, 8th, 15th, and 22th second OFDM signals-1 are different from the CP length added to the rest of the second OFDM signals-1. In this case, the interval of the first OFDM signal-1 that includes the two second OFDM signals is limited. Therefore, in a case that the subcarrier spacing is 30 kHz, out of the 28 second OFDM signals-1, the CP length added to the first, second, 15th, and 16th second OFDM signals-1, and the CP length added to the rest of the second OFDM signals-1 are set to be different from each other. Doing so causes two second OFDM signals-1 to be included in each of the intervals of the 14 first OFDM signals-1, thereby improving the flexibility.

Using the synchronization signal/discovery signal to synchronize the time/frequency, the terminal apparatus performs a cell search for detecting the physical cell identifiers (PCID, cell ID, system ID) and/or a beam search for detecting the beam identifier (beam ID, beam cell ID). It is to be noted that the cell ID may include the beam ID. In order to distinguish from the cell ID not including the beam ID, the cell ID including the beam ID is also referred to as an extended cell ID. The discovery signal includes part or all of the synchronization signal, the cell-specific reference signal, and the CSI-RS. In a case that the synchronization signal is generated based on the cell ID and the beam ID, the terminal apparatus can learn the cell ID and the beam ID from the synchronization signal sequence. In a case that the base station apparatus changes the beam pattern, based on the radio resource such as the subframe in which the synchronization signal is disposed, the synchronization signal is generated based on the cell ID and the radio resource information. The radio resource information is, for example, a subframe number and a subband number.

One type of synchronization signal may be used, or multiple types may be used. In a case that there are two types of synchronization signals, which are Primary Synchronization Signal (PSS) and Secondary Synchronization Signal (SSS), it is sufficient that the cell ID and/or beam ID can be learned using both the PSS and the SSS. Each type may include different functions. For example, the cell ID may be identified by the PSS and the beam ID may be identified by the SSS. In another example, the cell ID may be identified by the PSS and the SSS, and the beam ID is identified by another synchronization signal.

In a case that the base station apparatus supports data communication with the first parameter set and the second parameter set at the same carrier frequency (band), the base station apparatus may transmit the synchronization signal/discovery signal by using the first parameter and/or the second parameter. Namely, the base station apparatus may transmit the synchronization signal/discovery signal with a parameter determined for each carrier frequency/band. In this case, the terminal apparatus receives a synchronization signal/discovery signal of a parameter determined for each carrier frequency/band and performs cell search. The base station apparatus may transmit a synchronization signal/discovery signal with multiple parameters at a given carrier frequency/band. In this case, the terminal apparatus receives the synchronization signal/discovery signal of multiple parameters and performs cell search. Alternatively, for example, in a case that the parameters are determined for each service, a cell search is performed by receiving the synchronization signal/discovery signal of the parameter desired by the terminal apparatus.

The base station apparatus may configure a common signal interval in a given subframe. The common signal interval length can be configured by the number of OFDM symbols and time. In the common signal interval, part or all of the cell-specific reference signal, the CSI-RS, and the synchronization signal are transmitted. In a case of the same common signal interval length, the number of symbols included in the common signal interval changes in different parameter sets. For example, in a case of a common signal interval length including two first OFDM signals-1, four second OFDM signals-1 are included in the same common signal interval length. Therefore, in a case of transmitting the synchronization signal in the common signal interval, the second OFDM signal-1 can transmit more synchronization signals than the first OFDM signal-1, thus enabling the synchronization accuracy to be improved. In other words, from the viewpoint of cell search, since the second OFDM signal-1 is capable of transmitting the synchronization signals more repeatedly, it enables the coverage to be expanded while maintaining the synchronization accuracy. Note that the common signal interval may have a fixed length.

Figure 6:
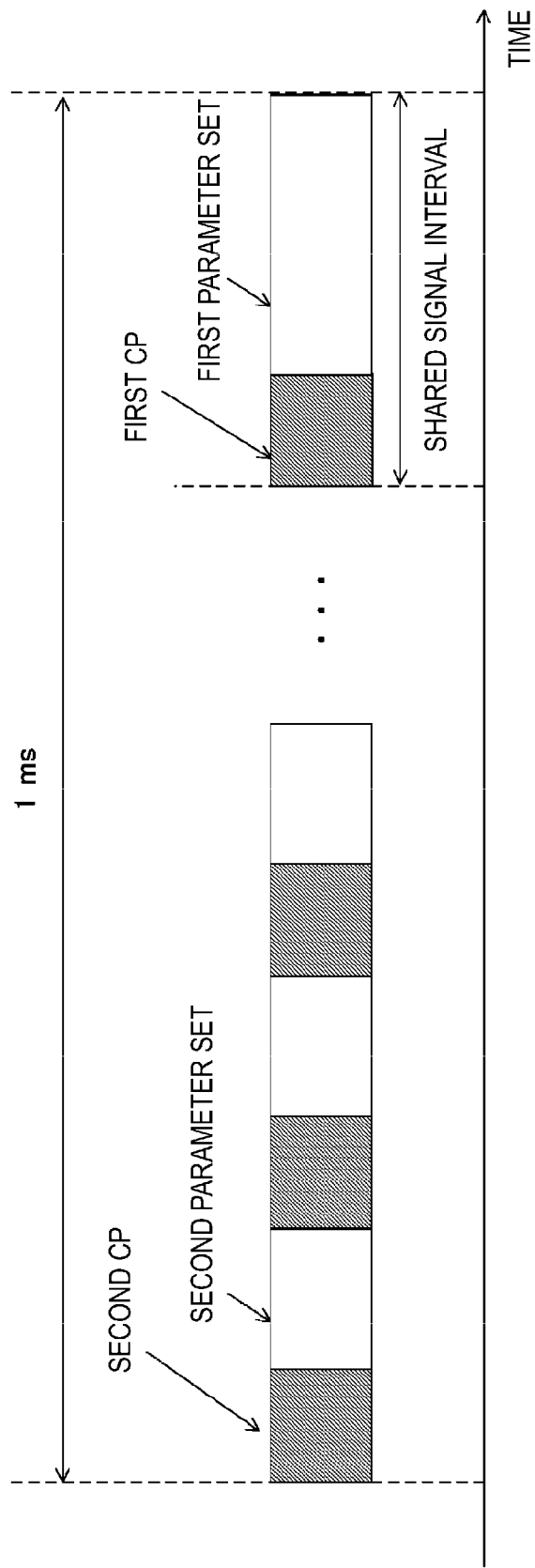
FIG. 6 is a diagram illustrating an example of the frame structure according to the present embodiment.

Further, in a case that the base station apparatus transmits the synchronization signal/discovery signal with a predetermined parameter (for example, the first parameter set) in a given carrier frequency and transmits the data signal with another parameter (for example, the second parameter set), the data signal may be transmitted in the first parameter set and the synchronization signal/discovery signal in the second parameter set. In this case, the terminal apparatus synchronizes with the base station apparatus with the synchronization signal/discovery signal of the second parameter set and demodulates the data signal with the first parameter set. FIG. 6 is a diagram illustrating an example of a subframe structure in a case that a data signal is transmitted with the second parameter set and a synchronization signal is transmitted with the first parameter set. In the example of FIG. 6, a common signal interval, which is a common signal interval in a cell, is configured within 1 ms. The signals transmitted in the common signal interval may be the same signal sequence in the cell or a different signal sequence for each terminal apparatus. Further, the common signal interval length may be fixed or may be configured by the base station apparatus. Note that different parameters can be used for the primary synchronization signal and the secondary synchronization signal. For example, the base station apparatus may transmit a primary synchronization signal with intra-cell common parameters (the first parameter set in the example of FIG. 6), and the secondary synchronization signal may be transmitted with the same parameters as the data signal (in the example of FIG. 6, the second parameter set). It should be noted that the synchronization signal of the intra-cell common parameter is also referred to as a cell specific synchronization signal, and the synchronization signal of the terminal specific parameter is also referred to as a terminal specific synchronization signal (a UE specific synchronization signal). The common signal interval may be configured in the subframe in which the synchronization signal is transmitted. For example, in a case that the synchronization signal is transmitted every 5 ms, the common signal interval is also configured at every 5 ms. It should be noted that the discovery signal can include a cell-specific synchronization signal.

The base station apparatus can frequency-multiplex multiple parameter sets. For example, in a given subframe, the base station apparatus can use the first parameter set in a given subband within the system band and the second parameter set in another subband. Namely, signals with different subcarrier spacings are multiplexed within the system band. In a case that the power spectral density in the system band is kept constant, the signal power per subcarrier of the first parameter set is smaller than the signal power per subcarrier of the second parameter set. Namely, in a case that the numbers of subcarriers allocated to the transmission signal of the first parameter set and to the transmission signal of the second parameter set are the same, the transmit power of the first parameter set is smaller than the transmit power of the second parameter set. In this case, the terminal apparatus can obtain and demodulate the receive power of the second parameter set with reference to the receive power of the first parameter set. In order to align the synchronization accuracy of each parameter set, it is preferable for the synchronization signal that the transmit power of the first parameter set and the transmit power of the second parameter set are set to about the same level. For example, within the same system band, the number of subcarriers of the synchronization signal of the first parameter set is made twice the number of subcarriers of the synchronization signal of the second parameter set. Alternatively, the number of subcarriers of the synchronization signal of the first parameter set is made the same as the number of subcarriers of the synchronization signal of the second parameter set, and the signal power per subcarrier is made the same. Further, in a case that the base station apparatus transmits a common reference signal to the first parameter set and the second parameter set, the terminal apparatus may learn the transmit power of the data signal/reference signal of different parameter sets specific to the parameter set, based on the transmit power of this reference signal.

Depending on whether the cell is an anchor cell such as a macro cell, the subframe structure can change. For example, the base station apparatus can transmit a subframe in which a common signal interval is configured in PCell, but in SCell, a subframe in which a common signal interval is configured need not necessarily be transmitted. In other words, the configuration related to the common signal interval is different between PCell and SCell, and the base station apparatus may choose not to configure the common signal interval in SCell. The base station apparatus can change the number of parameter sets for each cell of the same band. For example, the base station apparatus can transmit signals of one parameter set in the PCell, and can transmit signals of multiple parameter sets in the SCell. Further, the base station apparatus may use parameter sets common to each CC to perform transmission. In this case, the terminal apparatus performs communication in the SCell by using the parameter set configured in the PCell.

The base station apparatus can learn the suited CSI by a CSI report from the terminal apparatus. The CSI reported by the terminal apparatus includes the CQI/the PMI/the RI/the CRI/the PSI. The Parameter Set Indication (PSI) is an index indicating a suited parameter set out of multiple parameter sets. The CSI is calculated from a cell-specific reference signal and the CSI-RS. It is to be noted that the CSI-RS can transmit (configure) a non-precoded CSI-RS and/or a beam-formed CSI-RS. The base station apparatus can include information of the non-precoded CSI-RS or information of the beamformed CSI-RS in the configuration information of the CSI-RS. The information of the non-precoded CSI-RS includes part or all of information on the code book subset restriction (CBSR: Codebook Subset Restriction), information on a code book, and interference measurement restriction which is to configure whether to limit resources in a case of measuring interference. The information of the beamformed CSI-RS includes part or all of the ID list for the CSI-RS configuration, the ID list for the CSI-Interference Measurement (CSI-IM) configuration, information on the codebook subset restriction, and channel measurement restriction which is to configure whether to limit resources in a case of channel measurement. The ID list of the CSI-IM configuration is configured with one or more CSI-IM configuration ID information, and the CSI-IM configuration ID information includes part or all of the CSI-IM configuration ID and interference measurement restriction. CSI-IM is used for interference measurement.

The base station apparatus may include configuration (CSI process) on the procedure to calculate channel state information by associating at least CSI-RS for the channel measurement and the CSI-IM for interference measurement with the higher layer signaling. The CSI process can include part or all of its CSI process ID, information of non-precoded CSI-RS, and information of beamformed CSI-RS. The base station apparatus can configure one or more CSI processes. The base station apparatus can independently generate CSI feedback for each of the CSI processes. The base station apparatus can configure the CSI-RS resource and the CSI-IM differently for each CSI process. The terminal apparatus is configured with one or more CSI processes and independently reports CSI report for each configured CSI process. The CSI process is configured in a prescribed transmission mode.

For example, during high-speed travel, as inter-carrier interference occurs, a wider subcarrier spacing is desirable compared to low-speed travel. Because of this, the base station apparatus can transmit the CSI-RS configuration for the CSI report for each parameter set. At this time, the terminal apparatus can calculate the CSI for each parameter set and perform report to the base station apparatus. The base station apparatus can include a configuration of a parameter set in one CSI-RS configuration. In this case, the terminal apparatus selects a suitable parameter set from the configured multiple parameter sets and reports the PSI. It should be noted that the base station apparatus may dispose the CSI-RS of the parameter set which is different from the data transmission in the common signal interval. Further, the terminal apparatus can transmit a scheduling request or a communication request with a parameter set different from the data transmission to the base station apparatus. At this time, the base station apparatus transmits the CSI-RS of different parameter sets according to a request from the terminal apparatus.

As described above, there is a possibility that the base station apparatus transmits signals of multiple parameter sets at a given carrier frequency. In a case that neighboring cells also support multiple parameter sets, the terminal apparatus may possibly receive signals of different parameter sets as neighboring cell interference. The terminal apparatus may eliminate or suppress neighboring cell interference to mitigate the neighboring cell interference. In a case that the terminal apparatus has the function of eliminating or suppressing the neighboring cell interference, the base station apparatus can transmit the assist information (neighboring cell information) for eliminating or suppressing the neighboring cell interference. The assist information includes part or all of: physical cell ID, the number of CRS ports, PA list, PB, Multimedia Broadcast multicast service Single Frequency Network (MBSFN) subframe structure, transmission mode list, resource allocation granularity, subframe structure, ZP/NZP CSI-RS configuration, quasi co-location (QCL) information, frame format, supported parameter set, parameter set configured for each subframe, CP length, FFT size, system band, whether it is LTE or not. PA is a power ratio (power offset) of PDSCH and CRS in an OFDM symbol where CRS is not allocated. Pa is a power ratio (power offset) of PDSCH in an OFDM symbol where CRS is allocated and PDSCH in an OFDM symbol where CRS is not allocated. The subframe structure is information indicating whether the subframe is for uplink, downlink, or uplink and downlink. The QCL information is information on a prescribed antenna port, a prescribed signal, or QCL for a prescribed channel. In the two antenna ports, in a case that long-range characteristics of the channel carrying symbols on one antenna port can be estimated from the channel carrying symbols on the other antenna port, those antenna ports are referred to as QCL. Long-range characteristics include delay spread, Doppler spread, Doppler shift, average gain and/or average delay. Namely, in a case that the two antenna ports are QCL, the terminal apparatus can regard that the long-range characteristics of those antenna ports are the same. Note that, in each of the parameters included in the above-described assist information, one value (candidate) may be configured or multiple values (candidates) may be configured. In a case of multiple values being configured, the terminal apparatus interprets that a value is indicated possibly configured by an interfering base station apparatus, and detects (identifies) the parameter configured as the interference signal from multiple values. The assist information can remove or suppress part or all of the reference signal, PDSCH, (E) PDCCH transmitted from the neighboring cell. The above-described assist information may be used in a case that various types of measurement are carried out. The measurement includes Radio Resource Management (RRM) measurement. Radio Link Monitoring (RLM) measurement, and Channel State Information (CSI) measurement.

In a case that the terminal apparatus determines that the neighboring cell interference is LTE, the terminal apparatus can eliminate or suppress the interference signal using the assist information. Further, in a case that the configuration information of the subframe being transmitted by the serving cell and the configuration information of the subframe to which the neighboring cell interference is transmitted are the same, the terminal apparatus can eliminate or suppress the interference signal by using the assist information. The subframe structure information being the same means, for example, a case that the subframes of the serving cell and the neighboring cell are downlink and/or a case that the parameter sets are the same and/or a case that the CP length is the same. Further, in a case that the configuration information of the subframe being transmitted by the serving cell and the configuration information of the subframe transmitted by the neighboring cell are different from each other, the terminal apparatus does not perform the neighboring cell interference cancellation by using the assist information, and suppresses interference by a linear method. For example, this situation corresponds to a case that the neighboring cell is transmitting the uplink subframe, a case that a different parameter set is used, a case that a different CP length is used, or the like. In a case that there is a possibility by the neighboring cell communicating with a parameter set different from the parameter set used for communication with the serving cell, the terminal apparatus suppresses interference by a linear method instead of using the assist information to remove the neighboring cell interference. For example, in a case that the neighboring cell supports multiple parameter sets, the terminal apparatus does not remove neighboring cell interference by using the assist information. For example, in a case that the neighboring cell supports one parameter set and the terminal apparatus communicates with the serving cell using a different parameter set, the terminal apparatus does not remove neighboring cell interference by using the assist information.

Note that, the communication system according to the present embodiment can provide a System frame number (SFN) for frame synchronization between the base station apparatus and the terminal apparatuses, and between the terminal apparatuses connected to the base station apparatus. The SFN may be a serial number of frames transmitted by the base station apparatus or the terminal apparatus. The communication system according to the present embodiment is capable of counting the SFN as a given time length as a unit, regardless of the frame structure configured by the base station apparatus (or a radio parameter defining a frame structure, a base parameter determining a parameter of a radio frame, or a parameter set). Namely, even between the terminal apparatuses having different frame structures configured by the base station apparatus, a transmission in which a frame with the same SFN is received but the receiving subframe number (or the number of received subframe and the number of OFDM symbol) is different from each other, is possible in the base station apparatus according to the present embodiment.

Figure 7:
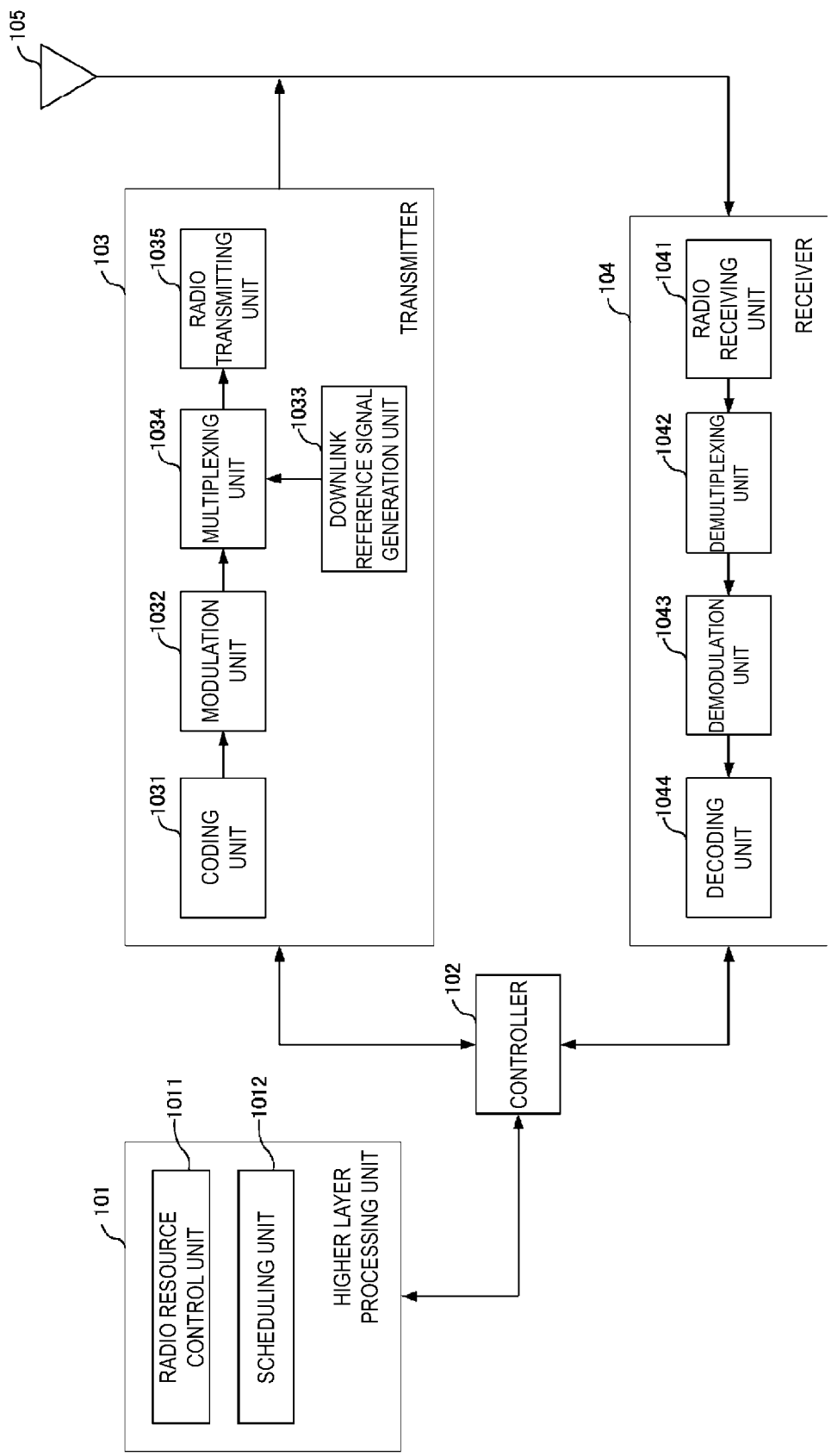
FIG. 7 is a block diagram illustrating an example of a configuration of a base station apparatus according to the present embodiment.

FIG. 7 is a schematic block diagram illustrating a configuration of the base station apparatus 1A according to the present embodiment. As illustrated in FIG. 7, the base station apparatus 1A is configured, including a higher layer processing unit (higher layer processing step) 101, a controller (controlling step) 102, a transmitter (transmitting step) 103, a receiver (receiving step) 104, and a transmit and receive antenna 105. The higher layer processing unit 101 is configured, including a radio resource control unit (radio resource controlling step) 1011 and a scheduling unit (scheduling step) 1012. The transmitter 103 is configured, including a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured, including a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as UE capability or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the stated terminal apparatus transmits information (parameters) indicating whether the prescribed function is supported. In a case that a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data, arranged in the downlink PDSCH (the transport block), system information, the RRC message, the MAC CE, and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates the information to be used for the scheduling of the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling of the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2 through the transmit and receive antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulation unit 1032 modulates the coded bits input from the coding unit 1031, in compliance with the modulation scheme prescribed in advance, such as Binary Phase Shift Keying (BPSK), quadrature Phase Shift Keying (QPSK), 16 quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence that is already known by the terminal apparatus 2A and that is acquired in accordance with a rule prescribed in advance based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like, generates an OFDM symbol, attaches a cyclic prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and receive antenna 105 for transmission.

In accordance with the control signal input from the controller 102, the receiver 104 demultiplexes, demodulates, and decodes the reception signal received from the terminal apparatus 2A through the transmit and receive antenna 105, and outputs information resulting from the decoding to the higher layer processing unit 101.

The radio receiving unit 1041 converts, by down-converting, an uplink signal received through the transmit and receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio receiving unit 1041 into the PUCCH, the PUSCH, and the signal such as the uplink reference signal. Note that, the demultiplexing is performed based on radio resource allocation information that is determined in advance by the base station apparatus 1A using the radio resource control unit 1011 and that is included in the uplink grant notified to each of the terminal apparatuses 2.

Furthermore, the demultiplexing unit 1042 makes a compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station apparatus 1A itself notified in advance, with the uplink grant, each of the terminal apparatuses 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 2 by the base station apparatus 1A itself, and outputs the decoded uplink data and uplink control information to the higher layer processing unit 101. In a case that PUSCH is re-transmitted, the decoding unit 1044 performs the decoding with the coded bits input from the higher layer processing unit 101 and retained in an HARQ buffer, and the demodulated coded bits.

Figure 8:
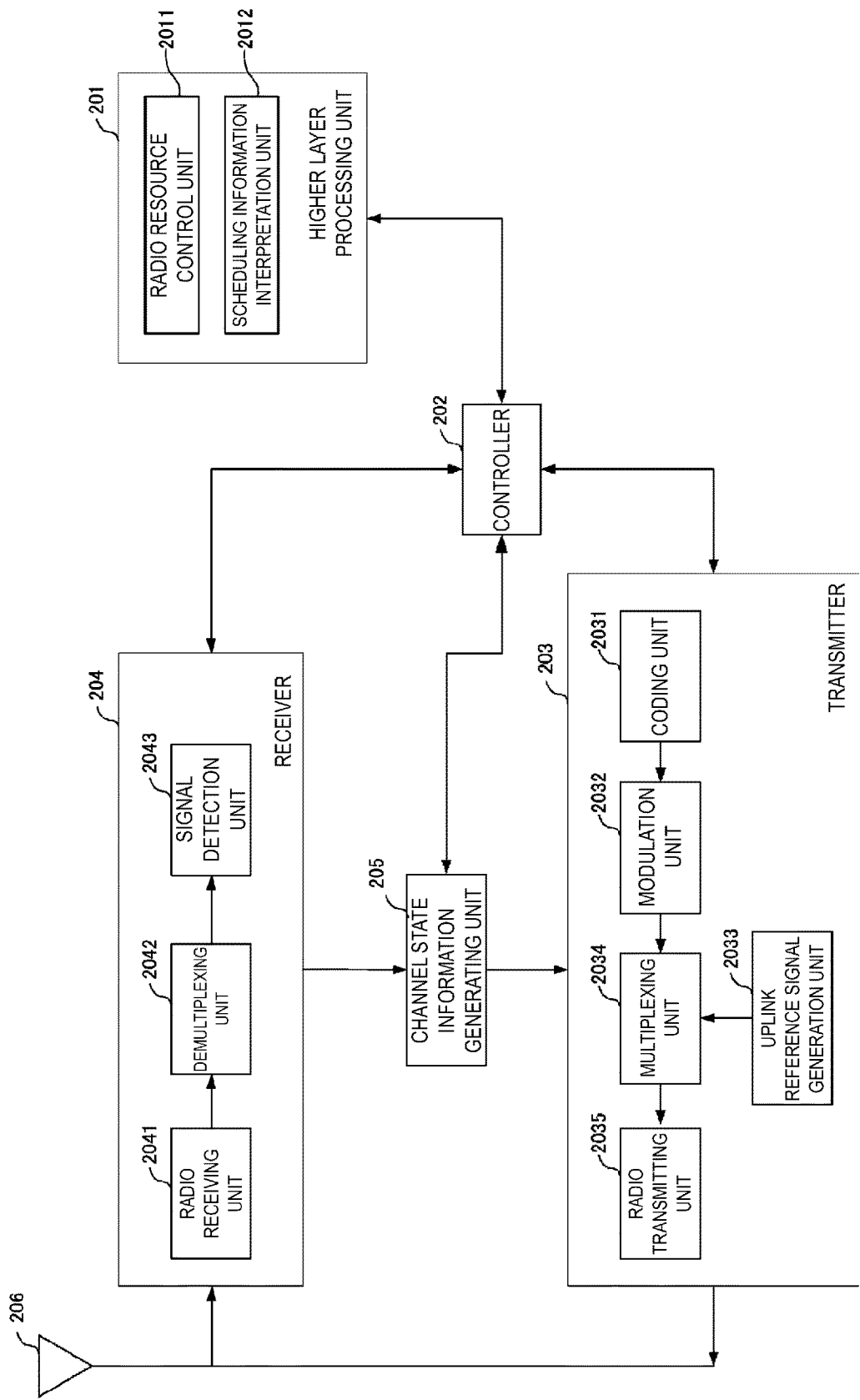
FIG. 8 is a block diagram illustrating an example of a configuration of a terminal apparatus according to the present embodiment.

FIG. 8 is a schematic block diagram illustrating a configuration of the terminal apparatus 2 according to the present embodiment. As illustrated in FIG. 7, the terminal apparatus 2A is configured, including a higher layer processing unit (higher layer processing step) 201, a controller (controlling step) 202, a transmitter (transmitting step) 203, a receiver (receiving step) 204, a channel state information generating unit (channel state information generating step) 205, and a transmit and receive antenna 206. The higher layer processing unit 201 is configured, including a radio resource control unit (radio resource controlling stop) 2011 and a scheduling information interpretation unit (scheduling information interpreting step) 2012. The transmitter 203 is configured, including a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 is configured, including a radio receiving unit (radio receiving step) 2041, a demultiplexing unit (demultiplexing step) 2042, and a signal detection unit (signal detecting step) 2043.

The higher layer processing unit 201 outputs the uplink data (the transport block) generated by a user operation or the like, to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmitter 203.

The radio resource control unit 2011 acquires configuration information of CSI feedback transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates the control information in order to control the receiver 204 and the transmitter 203 in accordance with the scheduling information, and outputs the generated information to the controller 202.

On the basis of the information input from the higher layer processing unit 201, the controller 202 generates a control signal for controlling the receiver 204, the channel state information generating unit 205, and the transmitter 203. The controller 202 outputs the generated control signal to the receiver 204, the channel state information generating unit 205, and the transmitter 203 to control the receiver 204 and the transmitter 203.

The controller 202 controls the transmitter 203 to transmit CSI generated by the channel state information generating unit 205 to the base station apparatus.

In accordance with the control signal input from the controller 202, the receiver 204 demultiplexes, demodulates, and decodes a reception signal received from the base station apparatus 1A through the transmit and receive antenna 206, and outputs the resulting information to the higher layer processing unit 201.

The radio receiving unit 2041 converts, by down-converting, a downlink signal received through the transmit and receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform on the signal from which CP has been removed, and extracts a signal in the frequency domain.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the controller 202. The controller 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmitter 203 generates the uplink reference signal in accordance with the control signal input from the controller 202, codes and modulates the uplink data (the transport block) input from the higher layer processing unit 201, multiplexes PUCCH, PUSCH, and the generated uplink reference signal, and transmits a result of the multiplexing to the base station apparatus 1A through the transmit and receive antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

The uplink reference signal generation unit 2033 generates a sequence acquired according to a rule (formula) prescribed in advance, based on a physical cell identity (PCI, also referred to as a Cell ID or the like) for identifying the base station apparatus 1A, a bandwidth to which the uplink reference signal is mapped, a cyclic shift notified with the uplink grant, a parameter value for generation of a DMRS sequence, and the like.

In accordance with the control signal input from the controller 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port.

The radio transmitting unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and receive antenna 206 for transmission.

It should be noted that the terminal apparatus 2 is not limited to the SC-FDMA scheme and can perform OFDMA modulation.

The controller 202 of the terminal apparatus 2 according to the present embodiment has a function of controlling transmit power of an uplink signal to the base station apparatus 1 generated by the transmitter 203. For example, the controller 202 can calculate the transmit power $P_{PUSCH,c}(i)$ related to the transmission of the i-th subframe to be transmitted to the c-th cell based on Equation (1).

Equation (1)

$$P_{PUSCH,c}(i) = \min\begin{cases} P_{CMAX,c}(i), \\ \begin{pmatrix} 10\log_{10}(M_{PUSCH,c}(i)) + P_{O\_PUSCH,c}(j) + \\ \alpha_c(j) \cdot PL_c + \Delta_{TF,c}(i) + f_c(i) \end{pmatrix} \end{cases} \quad (1)$$

$P_{CMAX,c}(i)$ is a term related to the maximum allowable transmit power of the terminal apparatus 2 related to the transmission of the i-th subframe to be transmitted to the c-th cell. $M_{PUSCH,c}(i)$ represents the number of resource blocks allocated to the terminal apparatus 2 in the transmission of the i-th subframe to be transmitted to the c-th cell. Namely, the term represented by $10 \log_{10} (M_{PUSCH,c}(i))$ is a term related to the amount of radio resources allocated to the terminal apparatus 2. $P_{O\_PUSCH,c}(j)$ is a term related to the target receive power at the time of transmission to the c-th cell, and can also be said to be a term related to the target receive power in a case that the terminal apparatus 2 transmits the uplink signal to the base station apparatus 1 including the c-th cell. Note that j is an integer, and changing j allows $P_{O\_PUSCH,c}(j)$ to be different values. $\alpha_c(j)$ is a term (coefficient) related to compensation of the propagation loss between the base station apparatus 1 including the c-th cell and the terminal apparatus 2. Note that j is an integer, and $\alpha_c(j)$ can be set to a different value by changing j. $PL_c$ is a term related to the propagation loss between the base station apparatus 1 including the c-th cell and the terminal apparatus 2. $\Delta_{TF,c}(i)$ is a term related to the modulation scheme performed by the modulation unit 2032 with respect to the signal included in the i-th subframe to be transmitted to the c-th cell. $f_c(i)$ is a term related to the control error which occurs in a case that the controller 202 controls the transmit power of the signal included in the i-th subframe to be transmitted to the c-th cell. The variable names of the respective terms of Equation (1) are configured for convenience of explanation, and the operation of the terminal apparatus 2 according to the present embodiment is not limited by the variable names, and each variable name may be any name.

The controller 202 of the terminal apparatus 2 according to the present embodiment is capable of controlling the transmit power, based on the frame structure configured by the multiplexing unit 2034 (the transmitter 203) (or the radio parameter defining the frame structure, or the base parameter that determines the parameter of the radio frame, or the parameter set). Specifically, at least one term of multiple terms included in Equation (1) is associated with a frame structure configured by the multiplexing unit 2034.

The controller 202 according to the present embodiment can control the transmit power with the length of one subframe as a control unit as presented in Equation (1). The controller 202 can also control the transmit power not by the subframe length but by an arbitrary control unit such as slot length, OFDM symbol length, SC-FDMA symbol length, frame length, and the like. The controller 202 according to the present embodiment can configure a unit for controlling the transmit power, based on the frame structure set by the multiplexing unit 2034. For example, for the 100th frame structure having a wide subcarrier spacing, the time interval (time granularity) for controlling transmit power by the controller 202 can be made narrower than the 200th frame structure in which the subcarrier spacing is narrower than the 100th frame structure. By controlling in this manner, the controller 202 can more flexibly control the transmit power of a signal having a frame structure with a short frame length (symbol length). The controller 202 according to the present embodiment can change the time unit for calculating multiple terms included in Equation (1) for each frame structure.

The controller 202 according to the present embodiment can configure the term related to the maximum allowable transmit power in Equation (1) for each frame structure. For example, the controller 202 can configure the maximum allowable transmit power in a frame structure requiring high reliability to be higher than other frame structures. By configuring in this way, the uplink signal transmitted to the base station apparatus 1 in the frame structure with a high maximum allowable transmit power can be received by the base station apparatus 1 with good reception quality in compared with the signal transmitted in other frame structure. In a case that high reliability is required (for example, in a case of a prescribed frame structure), the terminal apparatus 2 can always perform transmission with the maximum allowable transmit power without performing a transmit power control.

The controller 202 according to the present embodiment can configure the term related to the radio resource amount allocated to the terminal apparatus 2 in Equation (1) for each frame structure. Further, the controller 202 according to the present embodiment can configure the term related to the radio resource amount regardless of the frame structure and using a common unit. For example, the controller 202 according to the present embodiment can configure the term related to the radio resource amount in units of RB-2 in which the frequency bandwidth per unit is fixed. The bandwidth per unit of RB-2 is uniquely fixed, and thus, in a case that subcarrier spacings are different out of the parameters of the frame structure, the number of subcarriers included in RB-2 is also different. By using a common frequency unit, the controller 202 can configure a term related to the radio resource amount regardless of the frame structure.

The controller 202 according to the present embodiment can configure the term related to the target receive power in Equation (1) for each frame structure. For example, the controller 202 can configure the target receive power configured in a case of a prescribed frame structure higher or lower than the target receive power configured in a case of a frame structure other than the prescribed frame structure. Configuring the target receive power configured to a prescribed frame structure to be high by the controller 202 improves the reception quality of a signal having a prescribed frame structure. On the other hand, configuring the target receive power configured to a prescribed frame structure to be low by the controller 202 reduces the interference power exerted on a different cell or neighboring channel by a signal having a prescribed frame structure.

The controller 202 according to the present embodiment can further add to the term concerning the target receive power in Equation (1) a term related to the gain obtained by the beam forming performed by the base station apparatus 1 and the terminal apparatus 2. For example, the controller 202 can define $B_c(i)$ as a compensation coefficient for beam forming gain and configure $B_c(i) \times P_{O\_PUSCH,c}(j)$ as a term relating to the target receive power. In a case that a prescribed frame structure is configured, the controller 202 can take into account the compensation coefficient on the beam forming gain. The controller 202 can determine the compensation coefficient for the beam forming gain depending on whether the transmit and receive antenna 206 of the terminal apparatus 2 or the transmit and receive antenna 105 of the base station apparatus 1 performs beam forming. For example, the controller 202 can configure $B_c(i)$ to 1 in a case that beamforming is not performed, and configure $B_c(i)$ to a real number greater than 0 and smaller than 1 in a case that beam forming is performed.

The controller 202 can configure the term relating to the propagation loss compensation in Equation (1) for each frame structure. The controller 202 can configure a value included in a set of values that can be configured in terms relating to propagation loss compensation for each frame structure.

The controller 202 can configure the term related to the propagation loss in Equation (1) for each frame structure. For example, in a case that a prescribed frame structure is configured, the controller 202 can take into account the compensation coefficient on the beamforming gain in the term related to the propagation loss. For example, in a case having been configured to a prescribed frame structure, for configuring the propagation loss, the controller 202 can measure the propagation loss taking into consideration the gain by the beam forming performed by the base station apparatus 1 and the terminal apparatus 2.

The controller 202 can further add a term related to beam forming to Equation (1). As a term related to beam forming, the controller 202 can configure the gain obtained by the beam forming performed by the base station apparatus 1 and the terminal apparatus 2. In a case that a prescribed frame structure is configured, the controller 202 can configure a value selected from multiple values to the term related to the beam forming. In a case that a frame structure other than the prescribed frame structure is configured, the controller 202 can configure a prescribed value (for example, 0) to the term related to the beam forming. The controller 202 can configure the difference between the gain obtained by the beam forming performed by the base station apparatus 1 and the terminal apparatus 2 and the gain by the reference beam forming. As the gain by the reference beam forming, the controller 202 can use, for example, information on the reception gain of a signal including the common reference signal or the common control information transmitted from the base station apparatus 1. The controller 202 can use the information on the reception gain of the signal including the unique reference signal or the data addressed to the terminal apparatus 2, as the information on the gain obtained by beamforming.

In a case that the controller 202 controls the transmit power of the uplink signal having the prescribed frame structure based on Equation (1), the multiple terms included in Equation (1) can be calculated using the value configured for the prescribed frame structure. However, the controller 202 can also configure one or more of the multiple terms in Equation (1) to a common value regardless of the difference of the configured frame structure. For example, the propagation loss calculated in a given frame structure can be used as the propagation loss in another frame structure.

In a case that the controller 202 controls the transmit power of the uplink signal having the prescribed frame structure based on Equation (1), and the terminal apparatus 2 further uses multiple component carriers simultaneously (by carrier aggregation) to transmit an uplink signal, the controller 202 can calculate the transmit power for each component carrier and control the transmit power based on the summed value of calculated transmit power. At this time, the controller 202 can weight the component carriers to sum the transmit power of the component carriers, instead of simply adding up the transmit power. The controller 202 can determine a coefficient of weighting for each component carrier, based on the frame structure configured in the component carrier. It needs no mentioning that the controller 202 according to the present embodiment can also control the transmit power in a case of performing carrier aggregation of multiple component carriers for which different frame structures are configured.

In a case that the controller 202 controls the transmit power of an uplink signal having a prescribed frame structure based on Equation (1), and the terminal apparatus 2 further transmits, as an uplink signal, at least part of each of a data signal and a control signal simultaneously in different frequency resources, the controller 202 can subtract the transmit power required for transmission of the control signal from the term in Equation (1) on the maximum allowable transmit power. By controlling in this manner, the terminal apparatus 2 can avoid the problem that the control signal cannot be transmitted. The transmit power to be subtracted from the term concerning the maximum allowable transmit power of Equation (1), which is required for transmission of the control signal, by the controller 202 according to the present embodiment, can be configured based on the frame structure configured to the signal including the control signal.

The receiver 204 (the higher layer processing unit 201) of the terminal apparatus 2 can acquire the control information on at least one term of multiple terms included in Equation (1) from the base station apparatus 1. The terminal apparatus 2 can acquire the control information from the broadcast information of the base station apparatus 1 (for example, information included in Master Information Block (MIB) or System Information Block (SIB) notified via Broadcast Channel (BCH)). The terminal apparatus 2 can acquire the control information from the control information of the physical layer (for example, DCI notified via the PDCCH) transmitted from the base station apparatus 1. The cycle at which the terminal apparatus 2 acquires the control information from the base station apparatus 1 may be different for each frame structure to be configured.

The control information on at least one term out of the multiple terms included in Equation (1) acquired by the terminal apparatus 2 may be associated with a prescribed frame structure out of multiple frame structures. Based on the acquired control information associated with the prescribed frame structure, the controller 202 may configure at least one term out of multiple terms included in Equation (1), which is associated with the frame structure other than the prescribed frame structure.

The base station apparatus 1 can notify the terminal apparatus 2 of control information on at least one term out of multiple terms included in Equation (1) used at the time the terminal apparatus 2 controls the transmit power. The control information and the notification method for the base station apparatus 1 notifying the terminal apparatus 2 can be determined based on the frame structure configured by the base station apparatus 1. The base station apparatus 1 can broadcast the control information associated with a prescribed frame structure by including the control information in broadcast information (for example, information included in Master Information Block (MIB) or System Information Block (SIB) notified via a Broadcast Channel (BCH)). The base station apparatus 1 can transmit the control information associated with a prescribed frame structure by including the control information in the physical layer control information (for example, a signal including the DCI or a TPC command notified via the PDCCH). The cycle at which the base station apparatus 1 broadcasts or transmits a signal including the control information may be different for each frame structure to be configured. It should be noted that the base station apparatus 1 can be configured such that it is prevented from simultaneously transmitting the control information associated with different frame structures. The base station apparatus 1 can be configured such that the control information associated with a prescribed frame structure can be notified to the terminal apparatus 2 only with a signal having the prescribed frame structure.

At the time of controlling the transmit power, the controller 202 according to the present embodiment can configure the transmit power per subcarrier to a different value for each frame structure. For example, the transmit power per subcarrier in a frame structure with subcarrier spacing of 15 kHz can be configured to ½ of the transmit power per subcarrier in a frame structure with subcarrier spacing of 30 kHz. By thus controlling the transmit power by the controller 202, the transmit power per unit frequency (for example, the transmit power per 1 MHz, or the transmit power spectrum density) of the uplink signal transmitted from the terminal apparatus 2 can be made constant regardless of a frame structure. By controlling in this manner, for example, the flatness (evenness, smoothness) of the signal spectrum of the signal transmitted by the terminal apparatus 2 can be improved.

The terminal apparatus 2 according to the present embodiment can notify the base station apparatus 1 of information on the configured capability of the transmit power of its own apparatus. The information on the configured capability may be a Power headroom (PH). The controller 202 of the terminal apparatus 2 according to the present embodiment can calculate the power headroom $PH_{type1,c}(i)$ related to the transmission of the i-th subframe to be transmitted to the c-th cell based on, for example, Equation (2). Equation (2)

$$P_{PUSCH,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\} \quad (2)$$

As presented in Equation (2), PH is expressed as the difference between the maximum allowable transmit power of the terminal apparatus 2 and the transmit power of the terminal apparatus 2 requested by the base station apparatus 1. In a case that PH is a positive value, it means that the terminal apparatus 2 still has a margin in the transmit power (the terminal apparatus 2 can transmit a signal with a higher transmit power than the current transmit power). In a case that PH is 0, it indicates that the terminal apparatus 2 has no margin in the transmit power (the terminal apparatus 2 cannot transmit a signal with higher transmit power). In a case that the PH is a negative value, it means that the terminal apparatus 2 cannot transmit a signal with the transmit power requested by the base station apparatus 1. By the terminal apparatus 2 notifying the base station apparatus 1 of the PH, the base station apparatus 1 can grasp the amount of radio resources to be allocated to the terminal apparatus 2. Note that, in a case that the terminal apparatus 2 reports the PH to the base station apparatus 1 in a situation where it is not allocated a resource, the terminal apparatus 2 can calculate the PH without considering the radio resource amount. Further, in a case that resources are allocated but transmission is not possible for some reason, the terminal apparatus 2 can calculate the PH considering the allocated resources.

The terminal apparatus 2 according to the present embodiment can notify the base station apparatus 1 of the PH for each frame structure. The cycle at which the terminal apparatus 2 notifies PH to the base station apparatus 1 may be different for each frame structure. The terminal apparatus 2 can notify the base station apparatus 1 of only the PH relating to the frame structure requested by the base station apparatus 1.

Further, the base station apparatus 1 and the terminal apparatus 2 can determine a prescribed frame structure for calculating the PH in advance. In this case, the base station apparatus 1 can calculate the PH associated with the frame structure other than the prescribed frame structure from the PH associated with the prescribed frame structure notified from the terminal apparatus 2.

In Equation (2), the term subtracted from the maximum allowable transmit power includes all the terms included in Equation (1) used by the controller 202 at the time of calculating the transmit power. At the time of calculating the PH, the controller 202 according to the present embodiment does not necessarily include all of the multiple terms included in Equation (1) in the term subtracted from the maximum allowable transmit power. The term which the controller 202 includes in the term for subtracted from the maximum allowable transmit power may be a combination different for each frame structure to be configured or may be common between the frame structures.

Note that in the prescribed frame structure, the terminal apparatus 2 according to the present embodiment can always transmit the uplink signal with the maximum allowable transmit power of its own apparatus. In this case, since the PH is always 0 as long as a prescribed frame structure is configured, the terminal apparatus 2 does not have to notify the PH to the base station apparatus 1. Namely, the terminal apparatus 2 according to the present embodiment can be configured not to transmit PH by configuring a prescribed frame structure.

Note that the present invention can adopt the following aspects.

(1) Specifically, a terminal apparatus according to one aspect of the present invention is a terminal apparatus for communicating with the base station apparatus, including a receiver configured to receive a reference signal generated by a first parameter set and a reference signal generated by a second parameter set different from the first parameter set at least in terms of a subcarrier spacing, and a transmitter configured to transmit channel state information on the first parameter set or channel state information on the second parameter set to the base station apparatus by using the reference signal.

(2) A base station apparatus according to one aspect of the present invention is a base station apparatus for communicating with a terminal apparatus, including a transmitter configured to transmit a reference signal generated by a first parameter set and a reference signal generated by a second parameter set different from the first parameter set at least in terms of a subcarrier spacing, and a receiver configured to receive channel state information on the first parameter set or channel state information on the second parameter set from the terminal apparatus by using the reference signal.

(3) A communication method according to one aspect of the present invention is a communication method in a terminal apparatus for communicating with a base station apparatus, the method including the steps of receiving a reference signal generated by a first parameter set and a reference signal generated by a second parameter set different from the first parameter set at least in terms of a subcarrier spacing, and transmitting channel state information on the first parameter set or channel state information on the second parameter set to the base station apparatus by using the reference signal.

(4) A communication method according to one aspect of the present invention is a communication method in a base station apparatus for communicating with a terminal apparatus, the method including the steps of transmitting a reference signal generated by a first parameter set and a reference signal generated by a second parameter set different from the first parameter set at least in terms of a subcarrier spacing, and receiving channel state information on the first parameter set or channel state information on the second parameter set from the terminal apparatus by using the reference signal.

(5) A base station apparatus according to one aspect of the present invention is a base station apparatus for communicating with a terminal apparatus, including a transmitter configured to transmit a first signal generated by a first parameter set and a second signal generated by a second parameter set different from the first parameter set at least in terms of a subcarrier spacing, and a controller configured to control transmit power, wherein the controller performs control such that transmit power of the first signal per subcarrier and transmit power of the second signal per subcarrier are different from each other.

(6) In a base station apparatus according to one aspect of the present invention, the first signal and the second signal include a data signal and a synchronization signal, and the controller controls transmit power such that transmit power of a data signal generated by the first parameter set per subcarrier and transmit power of a data signal generated by the second parameter set per subcarrier are different from each other, and controls transmit power such that transmit power of a synchronization signal generated by the first parameter set per subcarrier and transmit power of a synchronization signal generated by the second parameter set per subcarrier are equal.

(7) In the base station apparatus according to one aspect of the present invention, the transmit power per subcarrier is calculated based on the subcarrier spacing.

(8) A terminal apparatus according to one aspect of the present invention is a terminal apparatus for communicating with a base station apparatus, including a receiver configured to receive a first signal generated by a first parameter set or a second signal generated by a second parameter set different from the first parameter set at least in terms of a subcarrier spacing, wherein transmit power of the first signal per subcarrier and transmit power of the second signal per subcarrier are different from each other.

(9) In a terminal apparatus according to one aspect of the present invention, the first signal and the second signal include a data signal and a synchronization signal, and transmit power of the data signal generated by the first parameter set per subcarrier and transmit power of the data signal generated by the second parameter set per subcarrier are different from each other, and transmit power of the synchronization signal generated by the first parameter set per subcarrier and transmit power of the synchronization signal generated by the second parameter set per subcarrier are equal.

(10) In the terminal apparatus according to one aspect of the present invention, the transmit power per subcarrier is calculated based on the subcarrier spacing, and the received signal is demodulated based on the calculated transmit power.

(11) A communication method according to one aspect of the present invention is a communication method in a base station apparatus for communicating with a terminal apparatus, the method including the steps of transmitting a first signal generated by a first parameter set or a second signal generated by a second parameter set different from the first parameter set at least in terms of a subcarrier spacing, and controlling transmit power, wherein the step of controlling transmit power controls such that transmit power of the first signal per subcarrier and transmit power of the second signal per subcarrier are different from each other.

(12) A communication method according to one aspect of the present invention is a communication method in a terminal apparatus for communicating with a base station apparatus, the method including the step of receiving a first signal generated by a first parameter set or a second signal generated by a second parameter set different from the first parameter set at least in terms of a subcarrier spacing, wherein transmit power of the first signal per subcarrier and transmit power of the second signal per subcarrier are different from each other.

A program running on an apparatus according to the present invention may serve as a program that controls a Central Processing Unit (CPU) and the like to cause a computer to operate in such a manner as to realize the functions of the embodiments according to the present invention. Programs or the information handled by the programs are temporarily stored into a volatile memory, such as a Random Access Memory (RAM), or a non-volatile memory, such as a flash memory, or a Hard Disk Drive (HDD), or other storage system.

Note that a program for realizing the functions of the embodiments according to the present invention may be recorded in a computer readable recording medium. This configuration may be realized by causing a computer system to read the program recorded on this recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, or a medium that holds a program dynamically for a short period of time, or another recording medium from which a computer can read programs or data.

Furthermore, each functional block or various characteristics of the apparatuses used in the above-described embodiments may be implemented or performed on an electric circuit, such as an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, and the processor may be a processor of known type, a controller, a micro-controller, or a state machine instead. The above-mentioned electric circuit may be constituted of a digital circuit, or may be constituted of an analog circuit. Furthermore, in a case that with advances in semiconductor technology, a circuit integration technology appears that replaces the present integrated circuits, one or more aspect of the present invention can use a new integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-133244, JP 2016-133245, and JP 2016-133246 filed on Jul. 5, 2016, and all the contents of JP 2016-133244, JP 2016-133245, and JP 2016-133246 are incorporated in the present international application by reference.

REFERENCE SIGNS LIST

1A Base station apparatus
2A, 2B Terminal apparatus
101 Higher layer processing unit
102 Controller
103 Transmitter
104 Receiver
105 Transmit and receive antenna
1011 Radio resource control unit
1012 Scheduling unit
1031 Coding unit
1032 Modulation unit
1033 Downlink reference signal generation unit
1034 Multiplexing unit
1035 Radio transmitting unit
1041 Radio receiving unit
1042 Demultiplexing unit
1043 Demodulation unit
1044 Decoding unit
201 Higher layer processing unit
202 Controller
203 Transmitter
204 Receiver
205 Channel state information generating unit
206 Transmit and receive antenna
2011 Radio resource control unit
2012 Scheduling information interpretation unit
2031 Coding unit
2032 Modulation unit
2033 Uplink reference signal generation unit
2034 Multiplexing unit
2035 Radio transmitting unit
2041 Radio receiving unit
2042 Demultiplexing unit
2043 Signal detection unit

The invention claimed is:

1. A communication apparatus comprising:
   modulation circuitry configured to produce modulation symbols by taking encoded bits as input, and
   transmission circuitry configured to selectively map the modulation symbols to a plurality of first OFDM symbols of a first subframe for a first bandwidth, the first bandwidth being a part of a predetermined bandwidth, or a plurality of second OFDM symbols of a second subframe for a second bandwidth, the second bandwidth being a part of the predetermined bandwidth, and transmit the plurality of first OFDM symbols or the plurality of second OFDM symbols, wherein
   each of the plurality of first OFDM symbols includes a plurality of first subcarriers, spacing between the plurality of first subcarriers being 15 kHz,
   each of the plurality of second OFDM symbols includes a plurality of second subcarriers, spacing between the plurality of second subcarriers being 30 kHz,
   the first subframe includes the plurality of first OFDM symbols and a plurality of first cyclic prefixes (CPs),
   a quantity of plurality of first OFDM symbols included in the first subframe is 14 and a quantity of plurality of first CPs included in the first subframe is 14,
   the second subframe includes the plurality of second OFDM symbols and a plurality of second CPs,
   a quantity of plurality of second OFDM symbols included in the second subframe is 28 and a quantity of plurality of second CPs included in the second subframe is 28,
   first two CPs of the plurality of first CPs are different in length,
   the plurality of second CPs include two types of CPs, the two types of CPs being different in length, and
   a length of a first CP of the first two CPs of the plurality of first CPs for the first bandwidth is equal to a combined length of first two CPs of the plurality of second CPs for the second bandwidth.

2. A communication method for a communication apparatus comprising:
   producing modulation symbols by taking encoded bits as input, and
   selectively mapping the modulation symbols to a plurality of first OFDM symbols of a first subframe for a first bandwidth, the first bandwidth being a part of a predetermined bandwidth, or a plurality of second OFDM symbols of a second subframe for a second bandwidth, the second bandwidth being a part of the predetermined bandwidth, and transmitting the plurality of first OFDM symbols or the plurality of second OFDM symbols, wherein
   each of the plurality of first OFDM symbols includes a plurality of first subcarriers, spacing between the plurality of first subcarriers being 15 kHz,
   each of the plurality of second OFDM symbols includes a plurality of second subcarriers, spacing between the plurality of second subcarriers being 30 kHz,
   the first subframe includes the plurality of first OFDM symbols and a plurality of first cyclic prefixes (CPs),
   a quantity of plurality of first OFDM symbols included in the first subframe is 14 and a quantity of plurality of first CPs included in the first subframe is 14,
   the second subframe includes the plurality of second OFDM symbols and a plurality of second CPs,
   a quantity of plurality of second OFDM symbols included in the second subframe is 28 and a quantity of plurality of second CPs included in the second subframe is 28, first two CPs of the plurality of first CPs are different in length, the plurality of second CPs include two types of CPs, the two types of CPs being different in length, and a length of a first CP of the first two CPs of the plurality of first CPs for the first bandwidth is equal to a combined length of first two CPs of the plurality of second CPs for the second bandwidth.

* * * * *